Nov. 6, 1956  F. LAZAN, JR  2,769,653
BUMPER GUARD
Filed Feb. 16, 1953
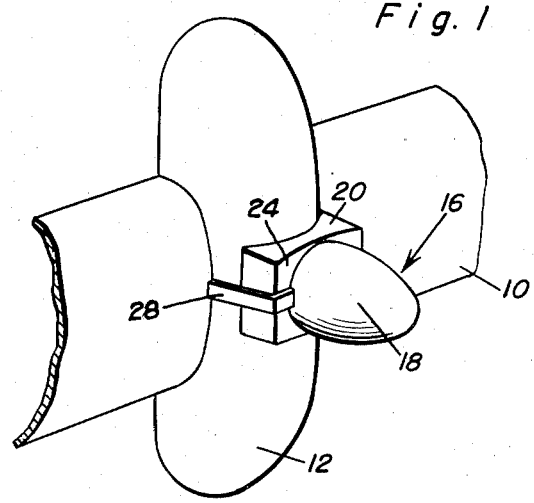
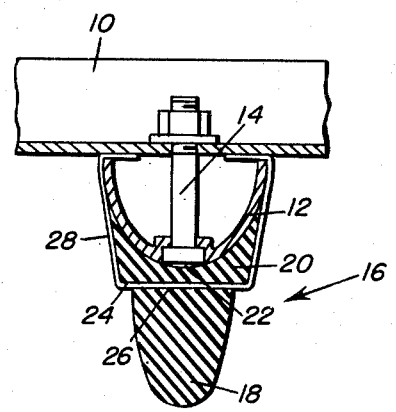
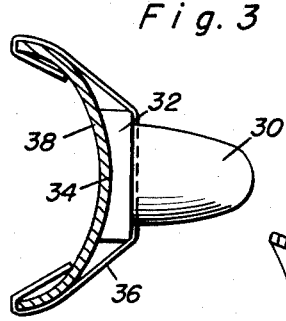
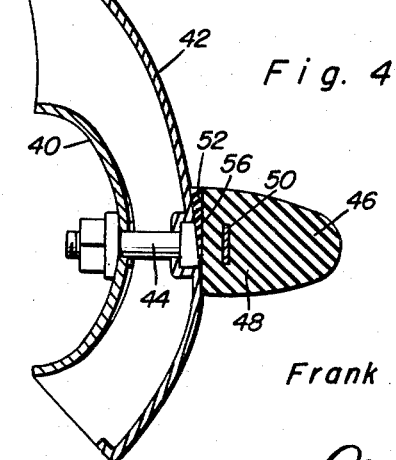
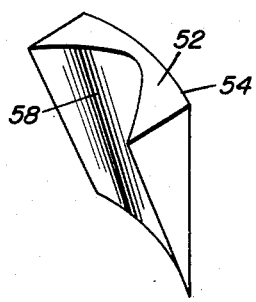
Frank Lazan, Jr.
INVENTOR.
BY *Clarence A. O'Brien*
and *Harvey B. Jacobson*
Attorneys

United States Patent Office 2,769,653
Patented Nov. 6, 1956

2,769,653
BUMPER GUARD

Frank Lazan, Jr., Morgantown, W. Va., assignor of fifty percent to Aldo Gianola, Morgantown, W. Va.

Application February 16, 1953, Serial No. 337,073

1 Claim. (Cl. 293—71)

This invention relates to a protective device for automotive vehicles, and more particularly to a protective bumper guard adapted to protect the chromium plating forming the finish of present day vehicle bumpers and bumper guards from unnecessary scratches and abrasions.

When parking in most crowded urban areas, vehicles are usually parked with bumpers engaging the bumpers of adjacent vehicles. Due to the various configurations of the bumpers of the respective vehicles, this usually causes minor dents and scratches to be formed in the bumpers. As soon as the continuity of the chromium plating or other surface finish of the bumpers is broken, oxidation of the ferrous portions of the bumper may readily take place. It is therefore the primary object of this invention to provide a protective bumper guard which is adapted to be emplaced in an optimum position to prevent scoring, scratching, or denting of a bumper or bumper guard.

The construction of this invention features the use of a resilient protective bumper guard that may readily be formed from rubber or any other similar material. A strap of deformable material is adapted to be positioned about and in embracing relationship on a bumper or bumper guard to be protected.

Still further objects of the invention reside in the provision of a protective bumper guard that is strong, durable, highly efficient in operation, simple in construction and manufacture, and ornamental in appearance.

These, together with the various ancillary objects of the invention which will become apparent as the following description proceeds, are attained by this protective bumper guard, a preferred embodiment of which has been shown secured in various manners, by way of example only, wherein:

Figure 1 is a perspective view showing the protective bumper guard comprising the present invention as operatively installed on a metallic bumper guard;

Figure 2 is a horizontal sectional view of the construction as shown in Figure 1;

Figure 3 is a side elevational view showing the device comprising the present invention as installed directly on a bumper;

Figure 4 is a vertical sectional view showing the installation of the invention on a metallic bumper guard which is provided with an irregularly contoured outer surface; and Figure 5 is a perspective view of the wedge comprising one element of the invention as shown in Figure 4.

With continuing reference to the accompanying drawings wherein like reference numerals designate similar parts throughout the various views, and with particular reference now to Figures 1 and 2, it will be seen that herein is provided a metallic bumper 10 of suitable curvature so as to provide an ornamental appearance while providing a rigid protective barrier. A metallic bumper guard 12 is secured on the bumper 10 in the conventional manner by use of a bolt fastener 14. The bumper guard 12 is continually subject to scratches, scoring and denting, and it is therefore that the device comprising the present invention, as generally indicated at 16, is provided.

The protective bumper guard 16 is formed from a suitable resilient material, such as rubber, or such synthetic plastic material as "neoprene." The protective bumper guard 16 is provided with a body portion including a substantially conical section 18 which is integrally molded with a base 20. The base 20 is provided with a concave inner surface 22 and a subtsantially flat outer surface 24. An aperture 26 extends through the body in the plane of the outer surface 24 of the base 20. A strap 28 of a deformable metallic composition is inserted in the aperture 26. The strap 28 is preferably provided in an unbent and undeformed condition in order that it may be readily engaged between the metallic bumper guard 12 and the bumper 10. This may readily be attained by bending the ends of the strap 28 to conform to the exterior configuration of the elements with which it is associated. In order to install this protective bumper guard 16, it is merely necessary to loosen the bolt fastener 14 and then readily insert the strap 28 in position. Then, the bolt fastener 14 may be tightened to hold the metallic bumper guard 12 and the strap 28 securely in position.

Referring now to Figure 3, it will be seen that herein there is provided the protective bumper guard which is formed from the same resilient material and which is provided with a conical section 30 and a base 32 having the concave inner surface 34. The strap 36 is secured within the protective bumper guard between the conical section 30 and the base 32. In this form of the invention, the manner of securing the bumper guard consists of bending the ends of the strap 36 over the upper and lower edges of bumper 38 using any convenient tool so as to arrange the strap 36 to conform to the contours of the bumper 38.

Referring now to the embodiment of the invention as is shown in Figure 4, it will be seen that herein the bumper 40 is provided with a metallic bumper guard 42 having an irregularly contoured outer surface which is not arranged with its parts above and below the axis of the bumper 40 symmetrical. The metallic bumper guard 42 is secured in the conventional manner by means of a bolt fastener 44. In this form of the invention, the conical section 46 is carried by a base section 48 with the strap 50 received therebetween. A wedge of resilient material 52 which is provided with a convex outer surface 54 adapted to conform with the inner surface 56 of the base 48 and with a concave inner surface 58 adapted to conform with the surface of the bumper guard 42 is received between the base 48 and the bumper guard 42. In order to secure the protective bumper guard on the irregularly contoured metallic bumper guard 42, it is merely necessary to loosen the bolt fastener 44 and with the wedge 52 abutting against the protective bumper guard, the straps 50 may be positioned. Then the bolt fastener 44 may readily be secured to hold the entire assembly in position.

Since from the foregoing, the construction and advantages of this protective bumper guard are readily apparent, further description is believed to be unnecessary.

However, since numerous modifications will readily occur to those skilled in the art after a consideration of the foregoing specification and accompanying drawings, it is not intended to limit the invention to the precise embodiments shown and described, but all suitable modifications and equivalents may be readily resorted to which fall within the scope of the appended claim.

What is claimed as new is as follows:

A protective device for use in combination with a bumper guard on a vehicle bumper, said device comprising a body of resilient flexible material, said body including a base having a concave inner surface and a substantially flat outer surface, said body further including a substantially conical section integrally formed with said base, said body having an aperture therethrough in the plane of the flat outer surface of said base, and a strap extending through said aperture in said body with a mid-portion of said strap being retained in said body, the end portions of said strap being received between said bumper guard and said bumper, and a fastener securing said bumper guard to said bumper urging said bumper guard toward said bumper clampingly holding said end portions of said strap between said bumper guard and said bumper.

References Cited in the file of this patent

UNITED STATES PATENTS

| | | |
|---|---|---|
| 1,558,332 | Basch | Oct. 20, 1925 |
| 1,789,039 | Gordon | Jan. 13, 1931 |
| 1,896,277 | Barry | Feb. 7, 1933 |
| 1,930,189 | Barbara | Oct. 10, 1933 |
| 2,144,167 | Sanders | Jan. 17, 1939 |
| 2,145,952 | Ryan | Feb. 7, 1939 |
| 2,624,607 | Weigand | Jan. 6, 1953 |